United States Patent [19]
Morley

[11] Patent Number: 5,751,982
[45] Date of Patent: May 12, 1998

US005751982A

[54] SOFTWARE EMULATION SYSTEM WITH DYNAMIC TRANSLATION OF EMULATED INSTRUCTIONS FOR INCREASED PROCESSING SPEED

[75] Inventor: John E. Morley, Kapaa, Hi.

[73] Assignee: Apple Computer, Inc., Cupertino, Calif.

[21] Appl. No.: 414,877

[22] Filed: Mar. 31, 1995

[51] Int. Cl.$^6$ ............................................. G06F 15/00
[52] U.S. Cl. ............................................. 395/800
[58] Field of Search ........................... 395/704, 705, 395/708, 709, 568, 385, 500; 385/500

[56] References Cited

U.S. PATENT DOCUMENTS

| | | | |
|---|---|---|---|
| 4,951,195 | 8/1990 | Fogg, Jr. et al. | 395/700 |
| 5,133,072 | 7/1992 | Buzbee | 395/700 |
| 5,301,302 | 4/1994 | Blackard et al. | 395/500 |
| 5,339,419 | 8/1994 | Chan et al. | 395/700 |
| 5,481,684 | 1/1996 | Richter et al. | 395/375 |
| 5,507,030 | 4/1996 | Sites | 395/800 |
| 5,546,552 | 8/1996 | Coon et al. | 395/375 |
| 5,560,013 | 9/1996 | Scalzi et al. | 395/700 |
| 5,574,927 | 11/1996 | Scantlin | 395/800 |

FOREIGN PATENT DOCUMENTS

| | | |
|---|---|---|
| 2203572 | 10/1988 | United Kingdom . |
| WO88/07718 | 10/1988 | WIPO . |
| WO94/27214 | 11/1994 | WIPO . |

OTHER PUBLICATIONS

Halfhill, Tom R., "Emulation: RISC's Secret Weapon", BYTE, Apr. 1994, pp. 119-130.

"Selecting Predecoded Instructions with a Surrogate", IBM Technical Disclosure Bulletin, vol. 36, No. 06A, Jun. 1993, pp. 35-38.

May, Cathy, "Mimic: A Fast System/370 Simulator", SIGPLAN '87 Symposium on Interpreters and Interpretive Techniques, Jun. 24-26, 1987, pp. 1-13.

Primary Examiner—Larry D. Donaghue
Attorney, Agent, or Firm—Burns, Doane, Swecker & Mathis

[57] ABSTRACT

The execution time overhead of software emulation is reduced by selecting frequently emulated instruction sequences in the software being emulated, and translating those instruction sequences into the instruction set of the emulating processor. In a first phase, frequently repeated sequences of emulated computer code are identified and selected for translation. In a second phase, the selected sequences from the instruction set of the emulated processor are translated into equivalent sequences for the instruction set of the emulating processor. In a third phase, the instruction sequence of the emulating processor is executed in lieu of emulating the original instructions from the emulated software.

8 Claims, 2 Drawing Sheets

SOFTWARE EMULATION SYSTEM WITH DYNAMIC TRANSLATION OF EMULATED INSTRUCTIONS FOR INCREASED PROCESSING SPEED

FIELD OF THE INVENTION

The present invention is directed to emulation systems which execute software instructions designed for a specific instruction set on a processor which supports a different instruction set, and more particularly to the use of dynamic translation of instructions to increase emulation performance.

BACKGROUND OF THE INVENTION

The central processing unit (CPU) of a computer is designed to execute a particular set of software instructions, which form the basis for the computer's operating system. Similarly, most application programs are designed to work with specific operating systems. In the past, for example, many computers were designed for complex instruction set computing, and are identified as CISC processors. Accordingly, application programs designed to run on these computers consist of commands taken from the instruction set for their processors. More recently, there has been a move toward reduced instruction set computing, so-called RISC. Application programs which are designed for a CISC class of processor will not normally run on a RISC-based processor. In order to utilize these application programs on a RISC processor, it is necessary for the RISC processor to emulate the operation of a CISC processor.

The instruction set of a typical processor defines a set of basic operations that can be performed on one or more operands. Software emulation that functionally implements the operation of a particular processor, for example a CISC processor, must be able to decode an instruction from the instruction set for the emulated processor and execute an equivalent sequence of instructions from the instruction set of a different processor, e.g. a RISC processor, on which the emulation is being performed.

In one of the more efficient approaches to software emulation, a jump table, also known as a dispatch table, is employed to decode instructions in an emulated processor's instruction set. Generally speaking, an instruction being emulated provides an address to a location in a dispatch table. This entry in the dispatch table contains a pointer to a sequence of equivalent instructions in the instruction set for the processor. This sequence of instructions forms a semantic routine whose execution results in the desired emulation of the original instruction.

One characteristic of an emulation system which has a significant impact on its overall performance is the considerable execution time overhead which the emulation system imposes. In particular, a good percentage of the time required for emulation is spent in the dispatching operations. In general, each instruction generated by an application program, in the instruction set for the processor being emulated, causes the emulator to address the dispatch table, which results in a jump to the corresponding semantic routine in the native, or emulation, code. Thus, for each instruction in the emulated code, the following sequence of actions occurs: (a) fetching the instruction to be implemented, (b) addressing the dispatch table, (c) obtaining the pointer to the native code, (d) fetching the first instruction for the corresponding semantic routine in the native code, and (e) executing the semantic routine.

It can be appreciated that the need to perform this sequence of operations for every instruction that is issued in the emulated code presents a substantial amount of processing overhead, which can significantly affect the overall performance of the emulator. It is desirable, therefore, to decrease the processing overhead that is required to emulate instructions, and thereby improve the overall performance of the emulator.

SUMMARY OF THE INVENTION

In accordance with the present invention, the processing overhead of an emulating system is reduced by selecting frequently emulated instruction sequences in the software being emulated and translating those instruction sequences into the native instruction set of the emulating processor. The dynamic translation process of the present invention is implemented in three main phases. In the first phase, an identification is made of those code sequences in the emulated software that are frequently repeated. This can be done, for example, by recording all program counter values that are produced by instructions that cause a non-sequential change in the value of the program counter for the emulated software. On a periodic basis, the recorded program counter values are analyzed, to identify code sequences which are emulated frequently enough to warrant dynamic translation. The program counter values which are selected identify the starting point of emulated code sequences to be translated.

In the second phase, the selected code sequences are translated from the instruction set of the emulated processor into the instruction set of the emulating processor. For each emulated instruction in a selected code sequence, its equivalent code sequence in the native instruction set is obtained from the emulator's set of semantic routines, by indexing into the dispatch table with a binary code for the emulated instruction. The successively retrieved code sequences are cumulatively stored in an instruction buffer, until each instruction in the selected sequence has been translated.

In the final phase, the translated sequence is executed in place of emulating the untranslated sequence. This is done by assigning each newly translated code sequence an available operation code from the emulated instruction set. The start of the untranslated instruction sequence is replaced with the value of this operation code, and the address of the translated instruction sequence is inserted in the dispatch table as the corresponding entry for this operation code. From that point on, the emulation software automatically executes the translated code sequence in lieu of emulating the untranslated code sequence, resulting in a substantial improvement in the time required to perform the emulation.

As a further feature of the invention, the computation of gratuitous values that are not employed during execution, such as flag values for emulated condition code registers, can be eliminated to further optimize the translated code sequence. In the implementation of this feature, an analysis of the emulated code sequence being translated is performed to identify any emulated instructions in the sequence which unnecessarily modify emulated condition flags. The modification of an emulated condition flag is unnecessary when a subsequent emulated instruction in the sequence modifies the same flag and no intervening emulated instruction either refers to the flag value or causes a non-sequential change to the emulated program counter value. For each emulated instruction where these conditions are met, an alternative native code sequence, which does not include the instructions to compute the unnecessary condition flag values, is employed in the translation of that emulated instruction.

Further features of the invention, as well as the advantages offered thereby, are explained in greater detail hereinafter with reference to specific embodiments illustrated in the accompanying drawings.

DETAILED DESCRIPTION

To facilitate an understanding of the present invention, it is described hereinafter with reference to its implementation in specific embodiments. In particular, the features of the invention are described in the context of an emulator system in which the instruction set of a processor designed for complex instruction set computing (CISC) is emulated by a processor which is designed for reduced instruction set computing (RISC). In this context, the instruction set for the CISC processor is identified as the "emulated code", and the instruction set for the RISC processor is labeled the "native code". It will be appreciated, however, that the practical applications of the invention are not limited to this particular embodiment. Rather, the invention will find utility in any emulator system in which a processor of one type functions as a virtual processor of another type.

Generally speaking, an emulator is a software program that runs on a computer and enables the computer to behave as though it were a different type of computer. In other words, it enables a computer of one type to function as a virtual processor of another type. Depending upon the portions of the program that are being executed at any particular time, as well as the architecture of the computer itself, various parts of the program may reside in different types of memory, including main memory, cache memory and/or permanent storage. In the following description, the term memory is employed in a generic sense to refer to any and all types of memory in which the emulator may reside. The particular forms of memory that are used for any particular implementation of the invention will be dependent upon choices made by the programmer, as well as the architecture of the computer system in which the implementation takes place. For this reason, discussion of specific registers and the like is omitted from the following discussion, so as not to obscure an understanding of the basic principles of the invention.

Figure 1:
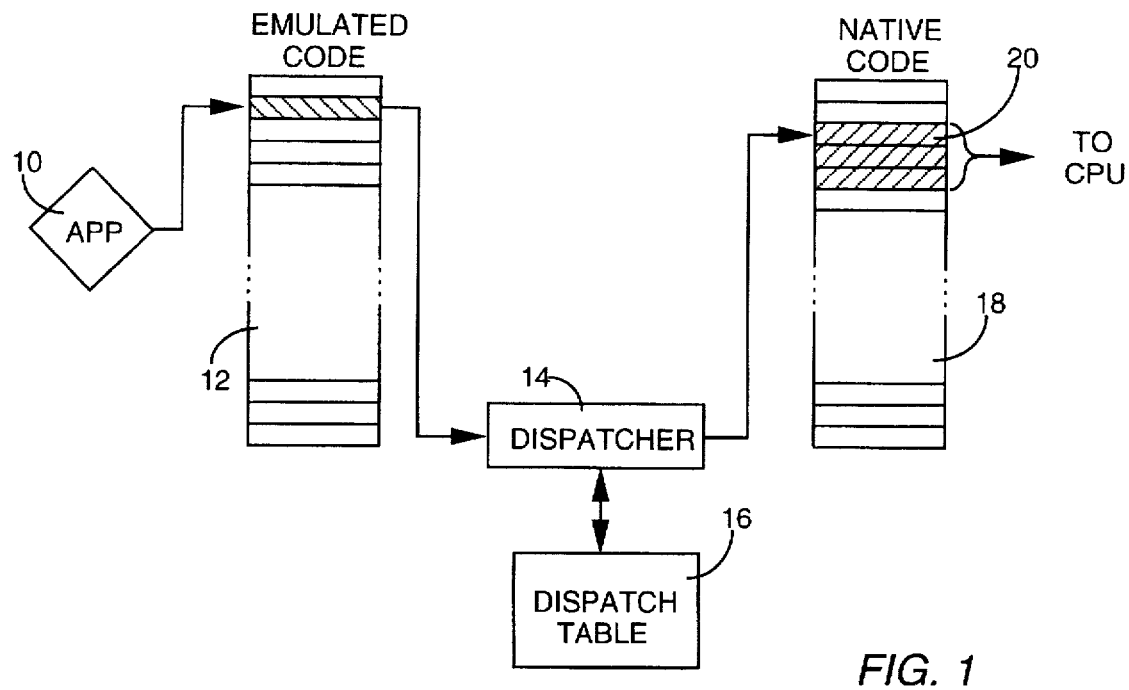
FIG. 1 is a block diagram of the software components of an emulator system.

The basic operations that are carried out in an emulator are illustrated in the block diagram of FIG. 1. The blocks in this diagram represent different items of software that are stored in the memory of the computer which is functioning as an emulator. Referring to FIG. 1, an application program 10 consists of commands that are designed for the instruction set of the emulated processor, in this case the CISC processor. In FIG. 1, the complete set of instructions for the emulated processor are represented by a list 12. In practice, the application program issues individual instructions for execution by the computer's CPU. For example, the instructions might be issued in response to user inputs. A particular instruction to be emulated by the processor is forwarded to a dispatcher 14. Associated with the dispatcher is a dispatch table 16, which contains pointers to sequences of instructions in the native code 18 that functionally correspond to each of the emulated code instructions. In response to information obtained from the dispatch table, the dispatcher 14 calls one or more corresponding instructions in the native code. The processor, in this case the RISC processor, executes the called instruction(s), and thereby emulates the operation of the CISC processor. In the particular example illustrated in FIG. 1, a single instruction issued by the application program 10 results in the execution of three consecutive instructions in the native code (represented by the shaded area 20). This set of three instructions in the native code which emulates the instructions in the emulated code is referred to as a "semantic routine".

Typically, instructions in the emulated code are not issued in some random order. Rather, groups of sequentially stored instructions tend to be repeatedly executed to perform an operation. In the context of the present invention, the term "code block" is employed to denote a series of sequential instructions in the emulated code which begins with the target of some non-sequential branch operation and whose extent is the maximum number of sequential instructions that can be executed by following code paths that begin with the first instruction in the sequence and are wholly contained within the sequence. A "code block", as defined herein, may contain conditional and unconditional branch instructions.

Figure 2:
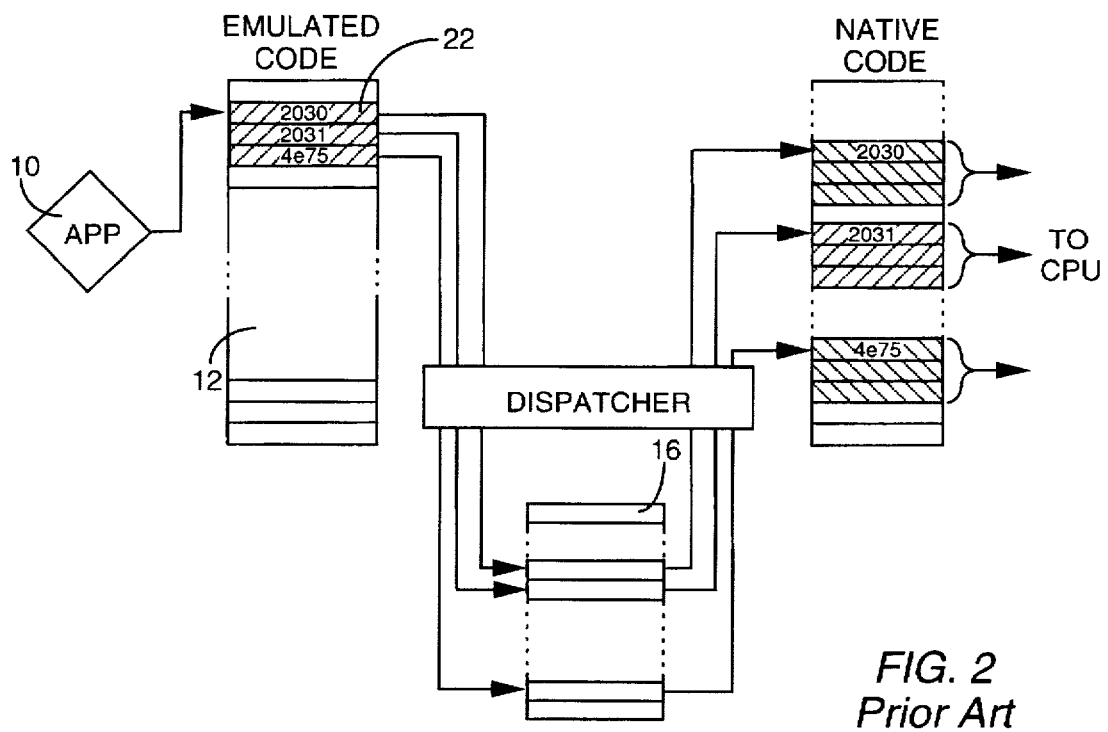
FIG. 2 is a block diagram similar to FIG. 1, which depicts the conventional translation of a code block.

Referring to FIG. 2, an example of a code block is represented by the shaded area 22. In a conventional emulation process, the instructions in a code block are individually translated each time they are encountered during the emulation process. As each instruction is fetched by the dispatcher 14, it functions as an address to the dispatch table 16. The dispatcher 14 retrieves the pointer stored at the addressed portion of the table 16, and calls the corresponding semantic routine to which the pointer refers, for execution. In the specific example of FIG. 2, the code block 22 consists of three instructions. As is conventional in most programs, each instruction is represented by a unique numerical value, known as its operation code, or opcode. For this example, the three instructions have the opcodes 2030, 2031 and 4e75. These three instructions respectively result in three dispatch operations to separately retrieve and execute three semantic routines for those opcodes, respectively. This need to continually dispatch each instruction as it is issued by the application program presents a significant amount of processing overhead in the overall operation of the emulator.

In accordance with the present invention, this processing overhead can be considerably reduced through dynamic translation of selected code blocks in the emulated application program. To implement this feature, the code blocks which are emulated frequently enough to warrant dynamic translation are first identified. This can be carried out by recording program counter values that produce non-sequential changes in the sequence of instructions being emulated. Whenever an instruction from the CISC code is emulated that results in a non-sequential change to the program counter, the new program counter value is recorded, for example by pushing its value onto a programmatic stack. In essence, each recorded program counter value represents the starting point of a new code block. Whenever there is a break in the operation of the emulator, for example as the processor stops emulation to service a special event or an interruption, the accumulated values are removed from the stack and analyzed to identify code blocks that are emulated more than a defined number of times within a predetermined time window. For example, if a particular block is emulated more than 256 times within a period of about 16 milliseconds, it may be selected. Any suitable approach can be employed to select the program counter values that identify the code blocks which occur with sufficient frequency. In the preferred embodiment of the invention, as each recorded program counter value is removed from the stack, its value is used as a hash index into a table of frequency counts, and the corresponding entry in the table is incremented by one. When the count is incremented beyond a predetermined threshold value, the program counter value corresponding to that table entry is placed on a list of code blocks to be dynamically translated.

Figure 3:
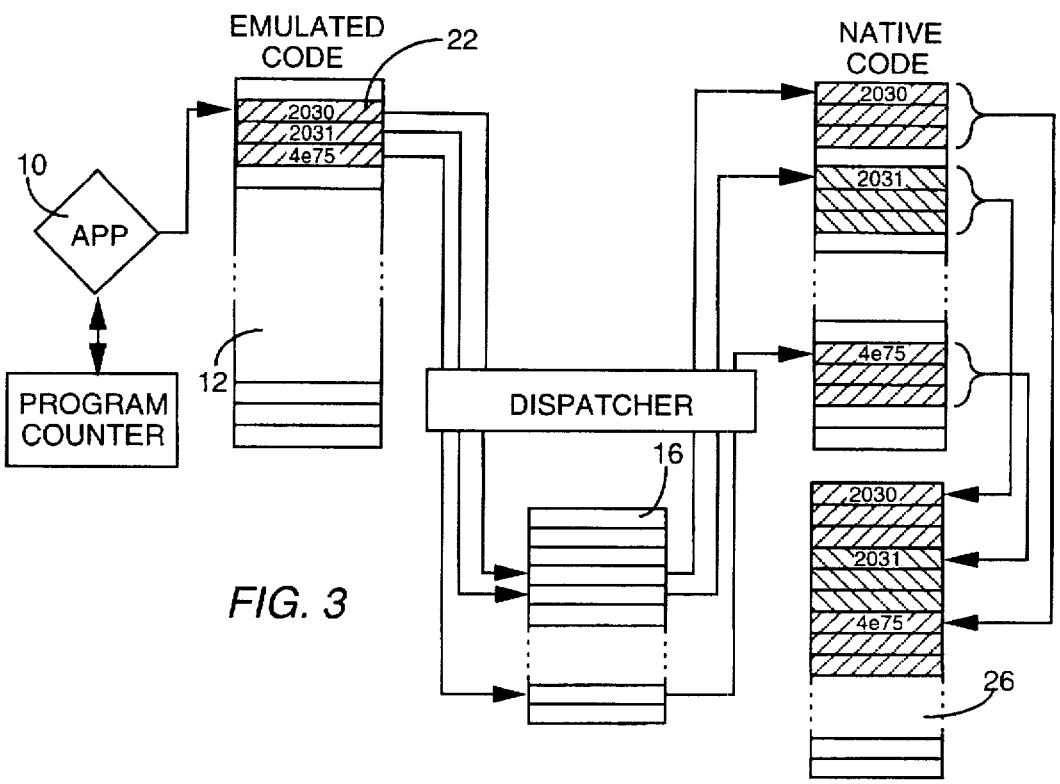
FIG. 3 is another block diagram similar to FIG. 1, depicting dynamic translation in accordance with the present invention.

The selected values identify the starting points of emulated code sequences, or code blocks, that are to be dynamically translated. Each code block begins with an instruction that is the target of a non-sequential change in the value of the program counter, and ends with the last instruction that can be reached by any code path that is wholly contained within the code block. Once a code block has been selected for dynamic translation, each instruction in the selected code block is translated from the instruction set of the emulated processor into the native code. For each instruction in the code block, its equivalent semantic routine is identified in the native code, using the dispatch table 16. Referring to FIG. 3, as the first instruction in the code block, in this example 2030, is translated, its corresponding semantic routine 2030 is stored in a buffer 26. As the next instruction in the code block is translated, its semantic routine 2031 is appended to the instructions stored in the buffer 26. This process is repeated until each instruction in the selected code block has been translated and its corresponding semantic routine stored in the instruction buffer 26.

This entire dynamic translation procedure, namely (a) the analysis of program counter values, (b) the identification of frequently emulated code blocks, and (c) the translation and storage of selected code blocks in the buffer, preferably takes place during the interruption of the emulation, i.e. prior to the time that the event which interrupted the emulation is serviced.

Figure 4:
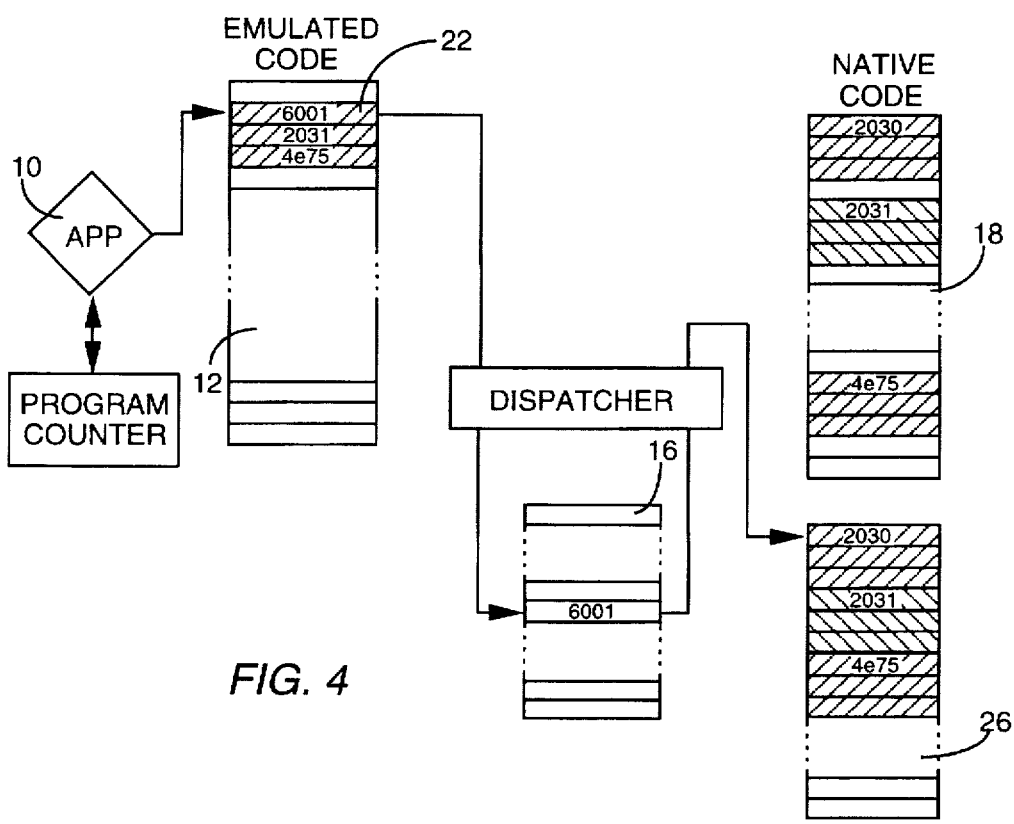
FIG. 4 is a block diagram depicting the execution of a translated code block.

Once the entire code block has been translated in this manner, the translated sequence is executed in place of emulating the individual instructions of the untranslated sequence. To do so, the newly translated code sequence is assigned an opcode from the instruction set of the emulated processor. For example, the instruction set for the Motorola 68000 series of microprocessors employs a 16-bit opcode. This presents the capability for over 65,536 different possible opcodes that can be represented. Of this number, about 50,000 are actually employed for the instruction set, leaving a remainder of about 15,000 unassigned operation codes that are available for other uses. In the implementation of the present invention, each newly translated code sequence that is stored in an instruction buffer 26 is assigned one of the available operation codes from the emulated instruction set. The beginning instruction of the untranslated instruction sequence 22 is overwritten with the value of this new, unassigned operation code. Referring to the example of FIG. 4, the opcode 6001 is assumed to be one such unassigned, and hence available, opcode. It is substituted for the opcode 2030 of the first instruction in the code block 22. In the dispatch table 16, the address of the translated instruction sequence in the buffer 26 is inserted as the corresponding entry for the new operation code. Subsequently, whenever the application program issues the first instruction in the translated code block, the dispatcher 14 will point to the translated code sequence, which will be automatically executed by the emulation software, in lieu of emulating the untranslated code sequence. Consequently, only a single call to the dispatcher is made, rather than a separate call for each instruction in the code block, resulting in a substantial improvement in the time required to perform the emulation.

As a side-effect of most instructions performed by a CISC class of processor, a register known as the Condition Code Register is modified to reflect certain data conditions that resulted from the execution of that instruction. These data conditions are typically referred to as flags. One of the more time-consuming aspects of performing a software emulation is the computation of new values for the flags contained in the emulated processor's Condition Code Register. Often, the computation of new condition code flags in response to a particular instruction is a gratuitous exercise, in the sense that a subsequent instruction typically replaces the previous instruction's condition code flag values with its own.

As a feature of the present invention, the performance of the emulator can be further improved by eliminating the computation of gratuitous condition code values under those conditions in which their elimination results in semantically identical results in the emulation of the code block. This feature of the invention can be implemented during the second phase of the dynamic translation process, i.e. while the instructions of the selected code block are being translated. During this phase, the instructions in the emulated code are analyzed to identify those situations in which a subsequent instruction, or set of instructions, modifies all of the condition code flags that are set by the instruction under analysis. If no intervening instructions refer to the condition code flags, or cause a potential non-sequential change in the program counter value, the computation of the condition code flags can be eliminated. In this situation, an alternative semantic routine, which does not include computation of the condition code flag values, is employed for the translation of the instruction under analysis. The alternate semantic routine for an emulated instruction can be stored immediately following the primary semantic routine for that instruction. In the case of some CISC instructions, the elimination of condition code flag computations can reduce the number of native instructions in the semantic routine by two-thirds, resulting in appreciable speed and code size savings.

From the foregoing, it can be seen that the present invention employs dynamic translation to significantly improve the execution time of a software emulator. The dynamic translation results in a single dispatch operation for an entire code block of the emulated code, thereby significantly reducing the dispatch overhead associated with the emulation process. In the implementation of the invention, it is desirable to translate as many instructions as possible in a code block. The longer the sequence of instructions that are dynamically translated, the greater the increase in the emulation speed. This increased performance is due to the elimination of instruction decoding overhead, as well as increased locality within the target processor's instruction caches. More particularly, the sequence of native instructions that comprises a translated code block will generally fit within the available instruction cache memory of a RISC processor. When the translated block contains frequently iterated loops of code, a large stream of instructions will be executed directly out of cache memory at a much greater overall instruction throughput. Conversely, if that same block were to be emulated, there will likely be cache conflicts generated between the emulator's dispatcher, the dispatch table, and the semantic routines, and these delays will be multiplied by the number of loop iterations within the block.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. In a computer having a processor which executes instructions from a first set of instructions, a method for emulating the operation of a different processor which executes a second set of instructions, comprising the steps of:

identifying a sequence of plural instructions in said second set of instructions which are repeatedly called with a predetermined frequency;

translating each of the instructions in said sequence into one or more corresponding instructions in said first set of instructions;

cumulatively storing the corresponding instructions from said translated instructions as a group; and executing the group of stored instructions when an initial instruction in said sequence is issued during subsequent operation of the computer, wherein each instruction in said second set of instructions has an associated operation code, and further including the steps of assigning an operation code to said group of stored instructions, and substituting said assigned operation code for the operation code associated with said initial instruction.

2. The method of claim 1 further including the steps of analyzing the instructions in said sequence to determine whether a given instruction calculates values that are recalculated by a subsequent instruction in said sequence and which are not utilized prior to said recalculation, and translating said given instruction into a corresponding instruction in said first set which does not calculate said values.

3. The method of claim 2 wherein said calculated values are condition code flag values.

4. In a computer having a processor which executes instructions from a first set of instructions, a method for emulating the operation of a different processor which executes a second set of instructions, comprising the steps of:

identifying a sequence of plural instructions in said second set of instructions which are repeatedly called with a predetermined frequency;

translating each of the instructions in said sequence into one or more corresponding instructions in said first set of instructions;

cumulatively storing the corresponding instructions from said translated instructions as a group; and executing the group of stored instructions when an initial instruction in said sequence is issued during subsequent operation of the computer, wherein said computer includes a program counter which identifies instructions from said second set to be executed, and wherein the step of identifying frequently called instructions comprises the steps of detecting each occurrence of a non-sequential change of value in said program counter, and counting the number of times that each non-sequential change of value is detected within a predetermined time period.

5. The method of claim 4 wherein said counting step comprises the steps of loading a value associated with said non-sequential change in a stack upon each detected occurrence, emptying said stack in response to an interruption in an emulation operation, and counting the number of occurrences of each value in said stack.

6. A software emulation system for emulating the operation of a first processor which executes a first set of instructions by means of a different processor which executes a second set of instructions, comprising:

a dispatcher for translating instructions issued from said first set of instructions into one or more corresponding instructions in said second set of instructions;

means for identifying a sequence of plural instructions in said first set of instructions which are repeatedly called with a predetermined frequency;

a buffer which cumulatively stores instructions from said translated instructions that respectively correspond to the instructions in an identified sequence; and means for causing the instructions stored in said buffer to be executed when an initial instruction in said sequence is issued, wherein each instruction in said first set of instructions has an associated operation code, and wherein said causing means assigns an operation code to the instructions stored in said buffer, and substitutes said assigned operation code for the operation code associated with said initial instruction.

7. The system of claim 6 further including means for analyzing the instructions in said sequence to determine whether a given instruction calculates values that are recalculated by a subsequent instruction in said sequence and which are not utilized prior to said recalculation, and means for translating said given instruction into a corresponding instruction in said first set which does not calculate said values.

8. A software emulation system for emulating the operation of a first processor which executes a first set of instructions by means of a different processor which executes a second set of instructions, comprising:

a dispatcher for translating instructions issued from said first set of instructions into one or more corresponding instructions in said second set of instructions;

means for identifying a sequence of plural instructions in said first set of instructions which are repeatedly called with a predetermined frequency;

a buffer which cumulatively stores instructions from said translated instructions that respectively correspond to the instructions in an identified sequence; and means for causing the instructions stored in said buffer to be executed when an initial instruction in said sequence is issued, wherein said identifying means includes a program counter which identifies instructions from said first set to be executed, means for detecting each occurrence of a non-sequential change of value in said program counter, and means for counting the number of times that each non-sequential change of value is detected within a predetermined time period.

* * * * *